Patented Jan. 21, 1947

2,414,639

UNITED STATES PATENT OFFICE 2,414,639

PROCESS FOR CONCENTRATING DIOLEFINS UTILIZING METHYL AMINES AS AZEOTROPE FORMERS

William Engs, Piedmont, and Simon N. Wik and Robert M. Roberts, Berkeley, Calif., assignors to Shell Development Company, San Francisco, Calif., a corporation of Delaware No Drawing. Application January 15, 1940, Serial No. 313,936

7 Claims. (Cl. 202—42)

1

The present invention relates to the concentration of a component of a fluid mixture in said mixture, and more particularly to the concentration of a component of a mixture the components of which possess little difference in vapor pressure so that practical concentration by fractional distillation of the mixture is very difficult if not impossible. The invention also pertains to increasing the concentration of olefinic hydrocarbons having more than one unsaturated linkage in the molecule, in a mixture of said olefinic hydrocarbons and of other hydrocarbons of less unsaturation, possessing similar vapor pressure, which hydrocarbons may or may not contain the same number of carbon atoms per molecule. The invention further includes an improved process for increasing the concentration of poly-olefins in mixtures containing these and other olefins with or without paraffinic hydrocarbons having substantially the same vapor pressures. In one of its specific embodiments, the invention provides means for increasing the concentration of diolefins, as for instance butadiene, in a mixture containing these diolefins and mono-olefins, such as butylenes, which have the same number of carbon atoms per molecule and which boil very close to the boiling point of the diolefin to be concentrated. The invention also covers the concentration of diolefins in a mixture containing the same and other olefins, such as mono-olefins, as well as paraffinic hydrocarbons, all of which have substantially the same vapor pressures so that the concentration of such olefins by ordinary fractional distillation is highly difficult, if not impossible.

It is known that olefinic hydrocarbons may be concentrated in mixtures containing these olefins and paraffinic hydrocarbons having the same number of carbon atoms per molecule, by distilling such mixture in the presence of a substance having a preferential attraction for the olefinic hydrocarbons, said substance lowering the vapor pressure of the olefins to a greater extent than that of the corresponding paraffins, thereby enabling the efficient fractional distillation to concentrate the olefinic hydrocarbons. This is disclosed and claimed in U. S. Patent 1,866,800, which teaches that mixtures of olefins and paraffins having the same number of carbon atoms per molecule and/or possessing little differences in vapor pressures, may be efficiently treated to increase the olefin concentration by subjecting the olefin-paraffin mixtures to distillation in the presence of a nitrogenous solvent with a preferential attraction for the olefin fraction. As an example, the patent discloses that the butylene content of a butane-butylene mixture may be greatly increased by subjecting the mixture to a distillation in the presence of liquid anhydrous ammonia or methyl amine. The patent teaches that a residual mixture containing only a small percentage of butane may be obtained by commingling a mixture of 40% butylene and 60% butane with a substantially equal quantity of liquid anhydrous ammonia, and by subjecting said resultant mixture to a fractional distillation under a superatmospheric pressure and a temperature at which an ammonia-butane binary azeotrope is obtained as an overhead distillate.

It is obvious that the teachings of U. S. Patent 1,866,800 are broadly directed to the concentration of various olefins in mixtures thereof with paraffins, such concentration being effected by distillation of the olefin-paraffin mixture in the presence of a solvent having a preferential attraction for the olefin fraction and, therefore, adapted to lower the vapor pressure of the olefin fraction to a greater extent than that of the paraffin fraction.

It has now been discovered that the same general principle as that described and claimed in connection with the separation of olefin-paraffin mixtures in U. S. Patent 1,866,800 is also applicable to the concentration of olefinic hydrocarbons having more than one unsaturated linkage. In other words, it has been discovered that mixtures comprising poly-olefinic and mono-olefinic hydrocarbons having the same number of carbon atoms per molecule and/or possessing little difference in vapor pressures, may be effectively treated to increase materially the concentration of the poly-olefins, by subjecting such mixtures to a fractional distillation in the presence of methyl amines. It has been also found that methyl amines aid in the fractional separation by distillation of mixtures comprising paraffinic, mono-olefinic and poly-olefinic hydrocarbons all of which have the same number of carbon atoms per molecule and/or which possess vapor pressures which are so close to each other that practical concentration or separation by ordinary fractional distillation of the mixture is practically impossible, or, at least, extremely difficult.

The invention may therefore be stated to reside broadly in separating poly-olefinic hydrocarbons from mono-olefinic hydrocarbons, as well as from mixtures comprising poly-olefinic, mono-olefinic and paraffinic hydrocarbons having the same number of carbon atoms per molecule and/or possessing relatively close boiling points, by adding to such hydrocarbon mixture methyl amines, and fractionally distilling the hydrocarbon mixture together with such solvent substance, whereby the poly-olefinic hydrocarbons will be concentrated in the residue. The invention further resides in the fractional separation of hydrocarbons containing paraffins, mono-olefins and diolefins into fractions predominating in each of said types of hydrocarbons, by subjecting said hydrocarbon mixtures to fractional distillation in the presence of methyl amine, this substance having a preferential solvent attraction for olefinic hydrocarbons as compared to that for paraffin, and a greater preferential attraction for diolefins as compared to that for the mono-olefinic hydrocarbons. Other features and advantages of the present invention will appear from the following description, it being understood that there is no intention of being limited by any specific details such as specific hydrocarbon mixtures, operating conditions, etc., which are described hereafter, the invention being solely limited by and co-extensive with the appended claims.

The invention is applicable for the concentration of various organic compounds having more than one unsaturated linkage in mixtures containing such compounds and other less unsaturated organic compounds possessing little difference in boiling points and/or vapor pressures. These organic compounds may or may not have the same number of carbon atoms per molecule. As illustrations of such mixtures which may be treated according to the present process reference may be made to allene-propylene, allene-propylene-propane, butadiene-butylene, butadiene-butylene-butane, isoprene-pentene, pentadiene-1,3-pentane mixtures, and the like, their homologues and analogues. It is to be noted that all of these mixtures consist of hydrocarbons having the same number of carbon atoms, these hydrocarbons being of different degrees of unsaturation. Some of these mixtures also contain the corresponding paraffinic hydrocarbons. Furthermore, the mixtures which may be concentrated in accordance with the teachings of the present invention may contain one or the other, or more than one isomer of a given poly-olefinic, mono-olefinic and/or paraffinic hydrocarbon. For instance, in the case of butadiene-butylene mixtures to be thus concentrated, the butadiene may be originally in a mixture containing one or more of the three known isomers of butylene, to wit: alpha-butylene, beta-butylene and iso-butylene. Similarly, mixtures of diolefins and mono-olefins having five carbon atoms per molecule may contain any of the isomers thereof, such as isoprene, pentadiene-1,3, pentadiene-2,3, 2-methyl butadiene-2,3, and the like, on the one hand, and the various amylenes with or without the pentanes on the other. Instead of having mixtures of hydrocarbons having the same number of carbon atoms per molecule, but a different degree of unsaturation, the mixtures which may be treated according to the present invention may consist of organic components of different degrees of unsaturation and possessing only small differences in vapor pressures or boiling points although having different numbers of carbon atoms per molecule. Also, the organic mixtures having different degrees of unsaturation, and which may be separated or concentrated in accordance with the present invention, may comprise and/or contain substituted derivatives, such as halogenated hydrocarbons. As a non-limiting example of this group of compounds, reference is made to mixtures containing chloroprene (2-chlor-butadiene-1,3) and less saturated chlorinated hydrocarbons, such as 2-chlor-butene-1, 2-chlor-butene-2, 2-chlor-butane, 1-chlor-butane, and the like.

As previously stated the concentration of relatively highly unsaturated compounds in mixtures thereof with components having a lesser degree of unsaturation, for example, the concentration of butadiene in mixtures containing butadiene and butylenes (in the presence or absence of butanes), is effected according to the present process by a fractional distillation of these mixtures in the presence of methyl amines, the solvent action of which for the different components of the mixture is proportional to the degree of unsaturation of the various components. In other words, such a substance has the strongest solvent action for the most highly unsaturated component, and the least for the least unsaturated component. For instance, in the case of a butadiene-butylene mixture, this substance has a preferential attraction for the butadiene. In the case of a butadiene-butylene-butane mixture, the substance, although having a solvent action for all of the components of the mixture, has a preferential attraction for the diene, while its solvent action for the mono-olefin, although being weaker than that for the diene, is stronger than for the butanes.

The afore-mentioned U. S. Patent 1,866,800 discloses and claims that nitrogenous solvents of the type of ammonia and amines, such as methylamine, have the ability of lowering the vapor pressure of olefins generally to a greater extent than that of the corresponding paraffins, so that when a mixture of such olefins and paraffins having very close vapor pressures or boiling points is subjected to fractional distillation in the presence of such nitrogenous solvent, it is possible to obtain an efficient concentration of the olefins, most of the paraffins being removed together with some of the solvent as an overhead distillate. It has now been discovered that methyl amines are also suitable for the fractionation of organic compounds comprising or consisting of components having a different degree of unsaturation but boiling within a relatively narrow range, said fractionation being effected by adding the nitrogenous solvent to the mixture, and subjecting the resultant mixture to fractional distillation, whereby the relatively less unsaturated components are removed as an overhead fraction so as to leave a residual fraction in which the relatively more highly unsaturated components are in a greater concentration than in the original mixture treated. Compounds which may be employed as addition agents or solvents having preferential solvent attraction for the more highly unsaturated organic components of an organic mixture containing them and other organic compounds which are less unsaturated and which have similar vapor pressures, include: primary, secondary and tertiary amines, such as the three methyl amines.

For the purpose of a clearer understanding of the present invention, it will be described herein as applied to the concentration or separation of butadiene-1,3 from a mixture thereof with butylenes, as well as from a mixture containing the butadiene, butylenes and butanes. The boiling points of the various hydrocarbons concerned are:

Paraffins

| | °C. |
|---|---|
| Normal butane | + 0.6 |
| Iso-butane | −10.2 |

Mono-olefins

| | °C. |
|---|---|
| Alpha butylene | − 6.1 |
| Beta butylene (trans) | + 1.0 |
| Beta butylene (cis) | + 3.7 |
| Iso-butylene | − 6.6 |

Diolefin

| | °C. |
|---|---|
| Butadiene-1,3 | − 4.4 |

The fact that there is only a slight difference between the boiling points of the butadiene and of alpha- and iso-butylenes renders it impossible, even after repeated distillations, to effect a separation of the butadiene from these mono-olefins. Similarly, the boiling points of the other butylenes and of the butanes are so close to that of the butadiene that the complete separation thereof from mixtures containing these hydrocarbons is very difficult even if the distillation is repeated several times in the most efficient fractional distillation columns.

On the other hand, when one of the above described solvents is added to such butadiene-butylene mixture, or to a mixture containing butadiene, butylenes and butanes, it has a solvent action which is strongest for the butadienes, somewhat weaker for the butylenes, and weakest for the butanes. As a consequence, this solvent lowers the vapor pressure of the butadiene to a greater extent than that of the mono-olefins and paraffins, thus enabling the efficient concentration, by fractional distillation in presence of one of said solvents, of butadiene in mixtures thereof with butylenes as well as of butanes. Such mixtures would be inseparable or difficultly separable if the aforementioned solvent was not present. For instance, in the absence of the solvent of the type of methyl amines, a distillate obtained by fractional distillation of a mixture containing butadiene and the butylenes would be somewhat, but not greatly richer in alpha- and iso-butylenes because of their slightly lower boiling points relative to beta-butylene and butadiene; by the addition of the aforementioned solvent and the distillation of the butylene-butadiene mixture in the presence of such solvent the butadiene becomes strongly concentrated in the residue, notwithstanding the fact that its boiling point is very close to the boiling points of alpha- and iso-butylenes.

The process of the present invention may be carried out either continuously or in batches. When operating in a continuous manner, the mixture to be treated (together with the described preferential solvent) may be fed into a distillation column maintained at the optimum or desired pressure and temperature. The overhead fraction is then cooled to a desired temperature, for example about 10° C. or lower in the case of a butylene-butadiene mixture, to secure stratification. The solvent-rich lower layer thus obtained may then be returned to the column as reflux, while the upper layer is continuously conveyed to a second distillation column wherein optimum or desired pressures and temperatures are maintained to obtain the distillation of an azeotrope predominating in the solvent. This overhead fraction may also be returned to the first column wherein is acts as a refluxing medium.

In the case where a butylene-butadiene mixture is thus continuously treated, the bottom fraction from the first distillation column, which fraction may be removed from the system either continuously or otherwise, is found to comprise substantially pure butadiene, while the bottoms from the second column comprise substantially pure butylenes.

In order to separate the solvent from the various fractions obtained, these fractions may be washed with water or treated in any other convenient manner well known to those skilled in the art.

The process according to the present invention may be operated over a fairly wide range of temperatures and pressures without impairing seriously its efficiency, these operating conditions varying, among other things, with the vapor pressures of the mixture from which the highly unsaturated components are to be separated or concentrated. For instance, besides the above mentioned still head temperature of 15° to 25° C. with a pressure of 120 to 140 lbs., successful concentration of butadiene in mixtures thereof with butylenes has been effected at about 36° C. and a corresponding pressure of around 200 pounds per square inch. Obviously, different pressures and temperatures may be advisable for the concentration of organic mixtures having a different vapor pressure range. For example, when it is desired to concentrate allene in mixtures containing or comprising allene and propylene (with or without propane) it may be advisable to operate at pressures in the neighborhood of 400 lbs. or higher.

The above description of the present process was made with particular reference to the concentration of butadiene in butadiene-butylene mixtures. It is to be understood, however, that the principles of the process are equally adapted for the concentration of other mixtures containing or comprising organic compounds of different degrees of unsaturation (with or without saturated organic components present in such mixtures), these components having relatively small differences in vapor pressures or boiling points, so that fractionation by ordinary fractional distillation is extremely difficult or even impossible. In this connection it may be noted that such mixtures containing, for example, hydrocarbons of different degrees of unsaturation and saturated hydrocarbons, all of which possess similar vapor pressures, may be separated into fractions predominating in the different hydrocarbons, this being effected either by fractional distillation of the whole mixture in the presence of one of the aforementioned preferential solvents, or by first subjecting the mixture to a solvent extraction to separate, for instance, the saturated hydrocarbons, followed by a fractional distillation of the mixture of unsaturated hydrocarbons according to the described process. For instance, if it is desired to concentrate butadiene in a mixture containing the butadiene, butylenes and normal butane, a fractional distillation in the presence of methyl amine, will effect the distillation first of the least polar compounds, i. e., butane, and then of the butylenes, leaving a residual fraction predominating in or comprising pure butadiene. As an alternative method, the butadiene-butylene-butane mixture may be extracted with a solvent, under such conditions that two layers are formed: the first, comprising the solvent or extract phase containing the major portion of the unsaturated hydrocarbons, and a second layer comprising a hydrocarbon raffinate phase predominating in the saturated hydrocarbon. After phase separation, the extract phase may be fractionally distilled in accordance with the process of the present invention to obtain a residual fraction in which the butadiene is concentrated. The solvent extraction step of the above described alternative process is described and claimed in the U. S. Patent 1,893,733.

As pointed out hereinabove, the present process is primarily directed for the separation or concentration of hydrocarbons of various degrees of saturation, which hydrocarbons have such a slight difference in vapor pressures or boiling points that separation by fractional distillation is difficult and even impossible. Without any desire of being limited, the process is particularly adapted for the fractionation of such mixtures the components of which boil, for example, within a 10° to 15° C. or a lesser temperature range.

Instead of treating a mixture of butylenes and butadiene directly in accordance with the present process, it may be possible to subject such mixture to an ordinary distillation to separate the beta-butylenes (which boil at +1.0° and +3.7° C.), and then to effect the mixture of butadiene, alpha-butylene and iso-butylene (as well as n-butane if such were present in the original mixture) to a fractional distillation in the presence of the above described preferential solvent.

We claim as our invention:

1. A process for concentrating butadiene contained in a mixture thereof with butylenes which comprises fractionally distilling said mixture with refluxing in the presence of liquid monomethyl amine in a quantity sufficient to produce an initial overhead fraction containing a major portion of the butylenes.

2. In a method of separating butadiene from a hydrocarbon mixture consisting essentially of hydrocarbons having four carbon atoms in the molecule and comprising butadiene and butylene, the steps which consist in forming a mixture of methylamine and the hydrocarbons to be separated from one another and fractionally distilling a mixture of methylamine and the hydrocarbons more saturated than butadiene from the latter to recover the butadiene in a form relatively free of the more saturated hydrocarbons.

3. In a continuous method for the separation of butylenes and butadiene from a hydrocarbon mixture comprising the same, the steps which consist in fractionally distilling the hydrocarbon mixture in the presence of methylamine to distil off a mixture of methylamine and butylene, continuously returning a portion of the distillate for purpose of reflux, continuously separating methylamine from the butylene in the remainder of the distillate and returning the methylamine to the distillation, withdrawing butadiene from a lower portion of the distilling column, and during said operations feeding additional quantities of the hydrocarbon mixture to the distilling system.

4. A process for concentrating a diolefin having more than 2 and less than 6 carbon atoms in the molecule contained in a mixture thereof with a mono-olefin possessing a vapor pressure of the same order of magnitude, which comprises distilling said mixture in the presence of methylamine to produce a vapor fraction containing the major portion of said mono-olefin and a residue containing the major portion of said diolefin.

5. In a method of separating a diolefin which contains more than 2 and less than 6 carbon atoms in the molecule from a hydrocarbon mixture comprising the same and a more saturated olefin having the same number of carbon atoms in the molecule, the steps which consist in adding methylamine to the hydrocarbon mixture and fractionally distilling at superatmospheric pressure, whereby a relatively low-boiling azeotrope of methylamine and said more saturated olefin is formed, the fractional distillation in the presence of methylamine being continued until a substantial proportion of the more saturated olefin has been separated from the diolefin.

6. In a method of separating a diolefinic hydrocarbon having more than 2 and less than 6 carbon atoms in the molecule from a hydrocarbon mixture consisting essentially of hydrocarbons having the same number of carbon atoms in the molecule and comprising said diolefinic hydrocarbon and a more saturated olefinic hydrocarbon, the steps which consist in forming a mixture of methylamine and the hydrocarbons to be separated from one another and fractionally distilling a mixture of methylamine and the hydrocarbons more saturated than said diolefinic hydrocarbon from the latter to recover said diolefinic hydrocarbon in a more concentrated form.

7. In a method of separating isoprene from a hydrocarbon mixture comprising the same and an amylene, the steps of fractionally distilling the liquefied hydrocarbon mixture in the presence of added methylamine, whereby an azeotrope of methylamine and the amylene is formed and distilled, continuing the distillation in the presence of methylamine until a substantial portion of the amylene has been separated from the isoprene.

WILLIAM ENGS.
SIMON N. WIK.
ROBERT M. ROBERTS.